(12) United States Patent
Kodama et al.

(10) Patent No.: US 11,446,998 B2
(45) Date of Patent: Sep. 20, 2022

(54) REAR STRUCTURE OF VEHICLE

(71) Applicant: MAZDA MOTOR CORPORATION, Hiroshima (JP)

(72) Inventors: Yuto Kodama, Aki-gun (JP); Koji Yoshimura, Aki-gun (JP); Taichi Hirakawa, Aki-gun (JP); Toshihiko Kawamura, Aki-gun (JP); Harumitsu Kubota, Aki-gun (JP); Takeshi Sasabe, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 151 days.

(21) Appl. No.: 16/995,515

(22) Filed: Aug. 17, 2020

(65) Prior Publication Data

US 2021/0061081 A1 Mar. 4, 2021

(30) Foreign Application Priority Data

Aug. 26, 2019 (JP) .............................. JP2019-153763

(51) Int. Cl.
  *B60K 1/04* (2019.01)
  *B62D 25/08* (2006.01)
  *B62D 25/20* (2006.01)

(52) U.S. Cl.
  CPC .............. *B60K 1/04* (2013.01); *B62D 25/087* (2013.01); *B62D 25/2027* (2013.01); *B60K 2001/0416* (2013.01); *B60K 2001/0438* (2013.01)

(58) Field of Classification Search
  CPC ....... B60K 1/04; B62D 25/87; B62D 25/2027
  See application file for complete search history.

(56) References Cited

U.S. PATENT DOCUMENTS

| 10,272,759 | B2* | 4/2019 | Sudhindra | ............... B60L 50/64 |
| 2019/0039446 | A1 | 2/2019 | Koike et al. | |
| 2021/0094625 | A1* | 4/2021 | Okamura | .................. B60K 1/04 |

FOREIGN PATENT DOCUMENTS

| JP | 2013018430 A | 1/2013 |
| KR | 10-1510052 B1 | 4/2015 |

* cited by examiner

*Primary Examiner* — Jonathan Ng
*Assistant Examiner* — James J Triggs
(74) *Attorney, Agent, or Firm* — Studebaker & Brackett PC

(57) ABSTRACT

A front-side cross member and a rear-side cross member in a front portion of a rear floor are spaced apart from each other, on a top side of the rear floor, ends of the front-side cross member in the vehicle width direction are connected to respective lower ends of left and right brace members extending up and down, while the rear-side cross member is disposed on the rear floor from an underside of the rear floor. A high voltage component is disposed on a top face in the front portion of the rear floor between the front and rear-side cross members, the high voltage component is disposed rearwardly spaced apart from the front-side cross member and closer to the rear-side cross member, and the high voltage component is attached to the front-side cross member via a bracket that deforms under a load in the vehicle front-rear direction.

17 Claims, 10 Drawing Sheets

REAR STRUCTURE OF VEHICLE

BACKGROUND

Technical Field

The present disclosure relates to a rear structure of a vehicle in which, for example, a high voltage unit is disposed on a top side of a rear floor.

Background Art

As exemplified in Japanese Patent Laid-Open No. 2013-18430, there is known a vehicle such as an electric vehicle and a hybrid vehicle in which a high voltage component such as a battery and a charger is disposed on a rear floor.

In a rear structure of a vehicle disclosed in Japanese Patent Laid-Open No. 2013-18430, a front-side cross member and a rear-side cross member are disposed at positions close to the front of a rear floor. These front-side cross member and rear-side cross member are spaced apart from each other in a vehicle front-rear direction and extend in a vehicle width direction across the rear floor.

The rear structure of a vehicle disclosed in Japanese Patent Laid-Open No. 2013-18430 uses a configuration in which a high voltage component is disposed on the rear floor such that the high voltage component is located between the above front and rear cross members and front and rear sides of the high voltage component are respectively attached to the front and rear cross members.

Thus, the rear structure of a vehicle disclosed in Japanese Patent Laid-Open No. 2013-18430 ensures rigidity of the attachment of the high voltage component to a vehicle body, and also provides protection of the high voltage component from direct collision therewith of a collision object intruding from behind the vehicle body in the event of a rear-end collision because the rear-side cross member blocks intrusion of the collision object itself.

However, there remains concern with the rear structure of a vehicle disclosed in Japanese Patent Laid-Open No. 2013-18430 that the high voltage component may be damaged by being pressed by vehicle body rear members of the own vehicle, such as a rear end panel and the rear floor, crushed by the rear-end collision.

SUMMARY

The present disclosure provides a rear structure of a vehicle that maintains the attachment of the high voltage component to the vehicle body in the event of a rear-end collision and restrains damage to the high voltage component by moving it to the vehicle front side.

This disclosure is a rear structure of a vehicle. The rear structure includes a front-side cross member and a rear-side cross member respectively disposed on front and rear sides in a front portion of a rear floor, the front-side cross member and the rear-side cross member extending in a vehicle width direction and being spaced apart from each other in a vehicle front-rear direction; and a high voltage component disposed between the front-side cross member and the rear-side cross member on a top side of the rear floor. The front-side cross member is disposed on the rear floor from the top side of the rear floor and ends of the front-side cross member in the vehicle width direction are connected to respective lower ends of left and right brace members extending up and down on respective sides of a vehicle body, the rear-side cross member is disposed on the rear floor from an underside of the rear floor, the high voltage component is disposed rearwardly spaced apart from the front-side cross member and closer to the rear-side cross member than to the front-side cross member, and the high voltage component is attached to the front-side cross member and the rear-side cross member, and the high voltage component is attached to the front-side cross member via a bracket that deforms under a load in the vehicle front-rear direction.

With the above configuration, the high voltage component is disposed rearwardly spaced apart from the front-side cross member, and the bracket is deformed under a load in the vehicle front-rear direction. This restrains damage to the high voltage component by moving it so as to escape frontward from collision of vehicle body rear members of the own vehicle, such as the rear floor, that are deformed in the event of a rear-end collision.

Additionally, by being deformed under a load in the vehicle front-rear direction, the bracket can reduce the forward-moving momentum of the high voltage component and thus can maintain the attachment of the high voltage component to the front-side cross member and prevent the high voltage component from moving frontward (toward an occupant space) beyond the front-side cross member.

Additionally, the front-side cross member is disposed on the rear floor from the top side of the rear floor and ends of the front-side cross member in the vehicle width direction are connected to respective lower ends of the left and right brace members extending up and down on respective sides of the vehicle body. This allows the front-side cross member to firmly receive the high voltage component even when the high voltage component is pushed forward in the event of a rear-end collision.

In one aspect of this disclosure, a rear end of the high voltage component is disposed directly above the rear-side cross member and is attached to a reinforcing member provided in the rear-side cross member.

With the above configuration, disposing the rear end of the high voltage component directly above the rear-side cross member allows the high voltage component to be attached as close to the rear-side cross member as possible. This in turn allows to ensure, to the extent possible, a distance (space in the vehicle front-rear direction) between the high voltage component and the front-side cross member located frontward thereof.

This increases protection of the high voltage component as the high voltage component is moved frontward away from the frontward pressing force that is applied from the collision object to the high voltage component in the event of a rear-end collision.

Further, the rear end of the high voltage component is fastened and fixed to the reinforcing member provided in the rear-side cross member, and this strengthens the attachment of the high voltage component to the vehicle body on the rear side thereof.

Here, disposing the rear end of the high voltage component directly above the rear-side cross member means disposing the rear end of the high voltage component such that it laps (overlaps) the rear-side cross member in the vehicle front-rear direction.

In one aspect of this disclosure, the bracket is structured to also serve as a ground for the high voltage component.

With the above configuration, the high voltage component can be ground-connected at the front side thereof in the front portion of the rear floor via the bracket. This allows to surely maintain the ground connection even after a rear-end collision, as compared to a configuration in which the ground connection is made at the rear side of the high voltage component that will experience large deformation by the rear-end collision.

In one aspect of this disclosure, the high voltage component is disposed below a trunk board that covers from above the rear floor, and the bracket includes a downward curved portion that extends frontward from a front face of the high voltage component and is deformable under a load in the vehicle front-rear direction.

With the above configuration, the bracket includes the downward curved portion, and the downward curved portion can be deformed to protrude downward when the bracket is compressively deformed in the vehicle front-rear direction in the event of a rear-end collision. The use of this bracket allows to avoid a situation where the deformed downward curved portion contacts the trunk board located above and thereby inhibits deformation in the vehicle front-rear direction.

In one aspect of this disclosure, a seat is disposed frontwardly adjacent to the front-side cross member, and the bracket is attached to a top face of the front-side cross member.

The above configuration allows for easy attachment of the bracket to the front-side cross member and also prevents the bracket from interfering with the seat.

In one aspect of this disclosure, the bracket is attached to a reinforcing member provided in the front-side cross member.

The above configuration allows to more firmly maintain the attachment of the bracket to the front-side cross member in the event of a rear-end collision and consequently to further restrain the frontward displacement of the high voltage component in the event of the rear-end collision.

This disclosure allows to maintain the attachment of the high voltage component to the vehicle body in the event of a rear-end collision and also to restrain damage to the high voltage component by moving it to the vehicle front side.

DETAILED DESCRIPTION

An embodiment of this disclosure will be described below with reference to the drawings.

A vehicle of the present embodiment is an electric vehicle whose driving force is provided by output from a rotary electric machine driven by power supplied from a vehicle battery. Referring to FIGS. 1 to 8, a detailed description will be given of a rear structure of this vehicle 1. In the figures, an arrow F represents a vehicle frontward direction, an arrow R represents a vehicle rightward direction, an arrow L represents a vehicle leftward direction, and an arrow U represents a vehicle upward direction.

Figure 1:
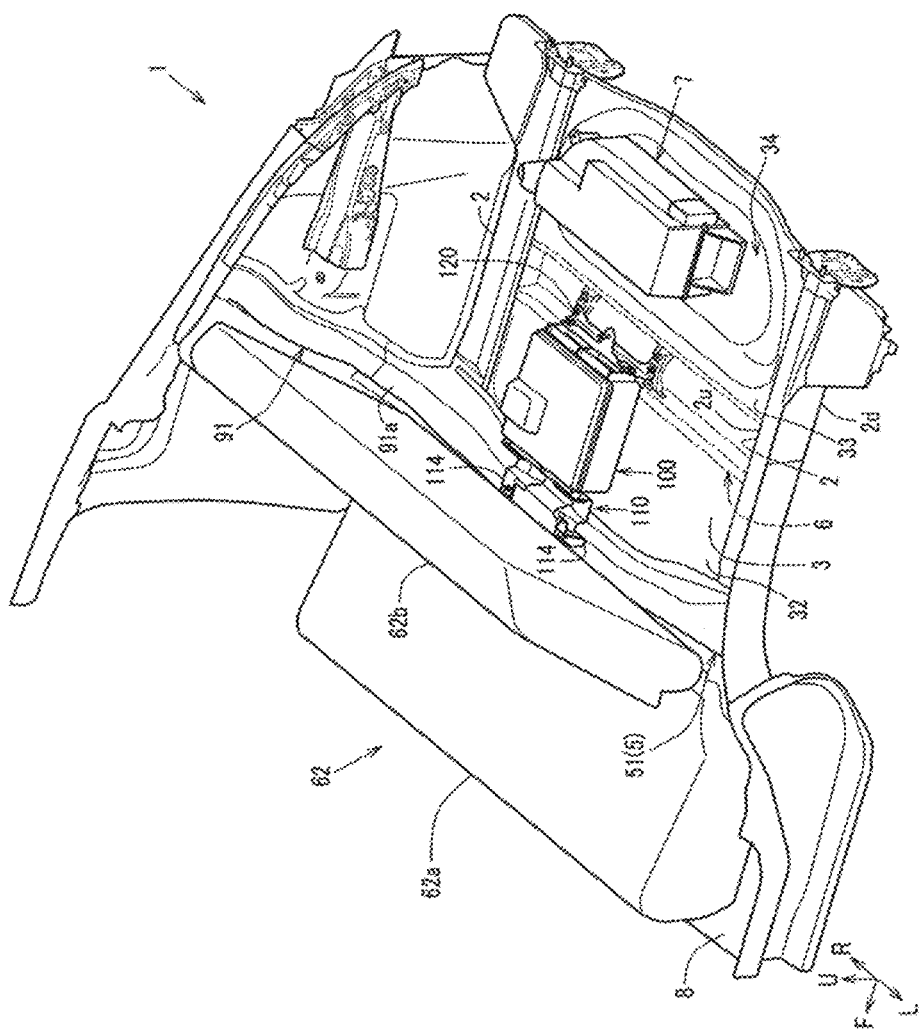
FIG. 1 is a perspective view of major parts of a rear structure of a vehicle of the present embodiment, as viewed from the rear left side.

As shown in FIG. 1, the vehicle 1 includes in its rear portion: a pair of left and right rear side frames 2 spaced apart from each other at a predetermined distance in a vehicle width direction and extending in a vehicle front-rear direction; a rear floor panel 3 disposed between the left and right rear side frames 2; a rear end panel (see FIG. 3) disposed at a rear end of the rear floor panel 3; a front-side rear cross member 5 connecting front portions of the left and right rear side frames 2 in the vehicle width direction; and a rear-side rear cross member 6 located on a vehicle rear side of the front-side rear cross member 5 and connecting the left and right rear side frames 2 in the vehicle width direction.

Each rear side frame 2 includes, in a vertical section along the vehicle width direction, an upper frame 2u located on a vehicle upper side and having a substantially flat cross-section and a lower frame 2d located on a vehicle lower side of the upper frame 2u and having a substantially gate-shaped cross-section opening upward (see FIG. 8), though description of a detailed structure of the rear side frame 2 is omitted.

The upper frame 2u and the lower frame 2d of the rear side frame 2 are joined to form a substantially rectangular closed cross-sectional space in vertical sectional view along the vehicle width direction.

Figure 3:
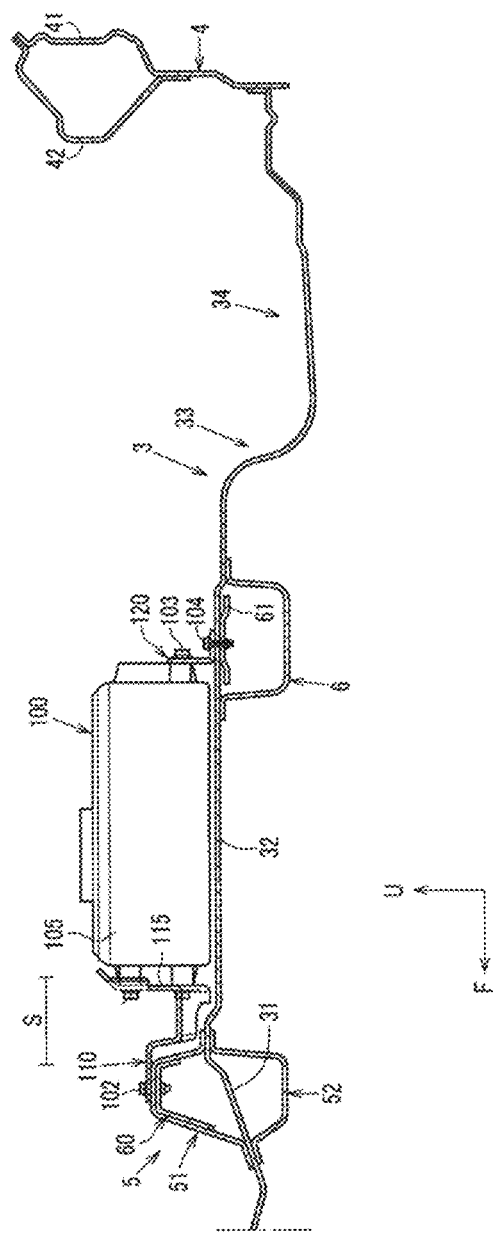
FIG. 3 is a sectional view of major parts of the rear structure of the vehicle of the present embodiment, taken along a line A-A in FIG. 2.

As shown in FIG. 3, the rear floor panel 3 is a panel member forming a trunk floor of the vehicle 1 on the vehicle rear side of a vehicle cabin floor (not shown) of the vehicle 1. As shown in FIG. 3, in a vertical section along the vehicle front-rear direction, the rear floor panel 3 is integrally formed of: an inclined portion 31 extended to a vehicle rear upper side from a rear end of a front floor panel (not shown) that forms the vehicle cabin floor; a front floor portion 32 extended from a rear end of the inclined portion 31 to a rear end of the rear-side rear cross member 6 (described later) and having a substantially flat shape; and a rear floor portion 33 extended further to the vehicle rear side from the front floor portion 32.

Figure 2:
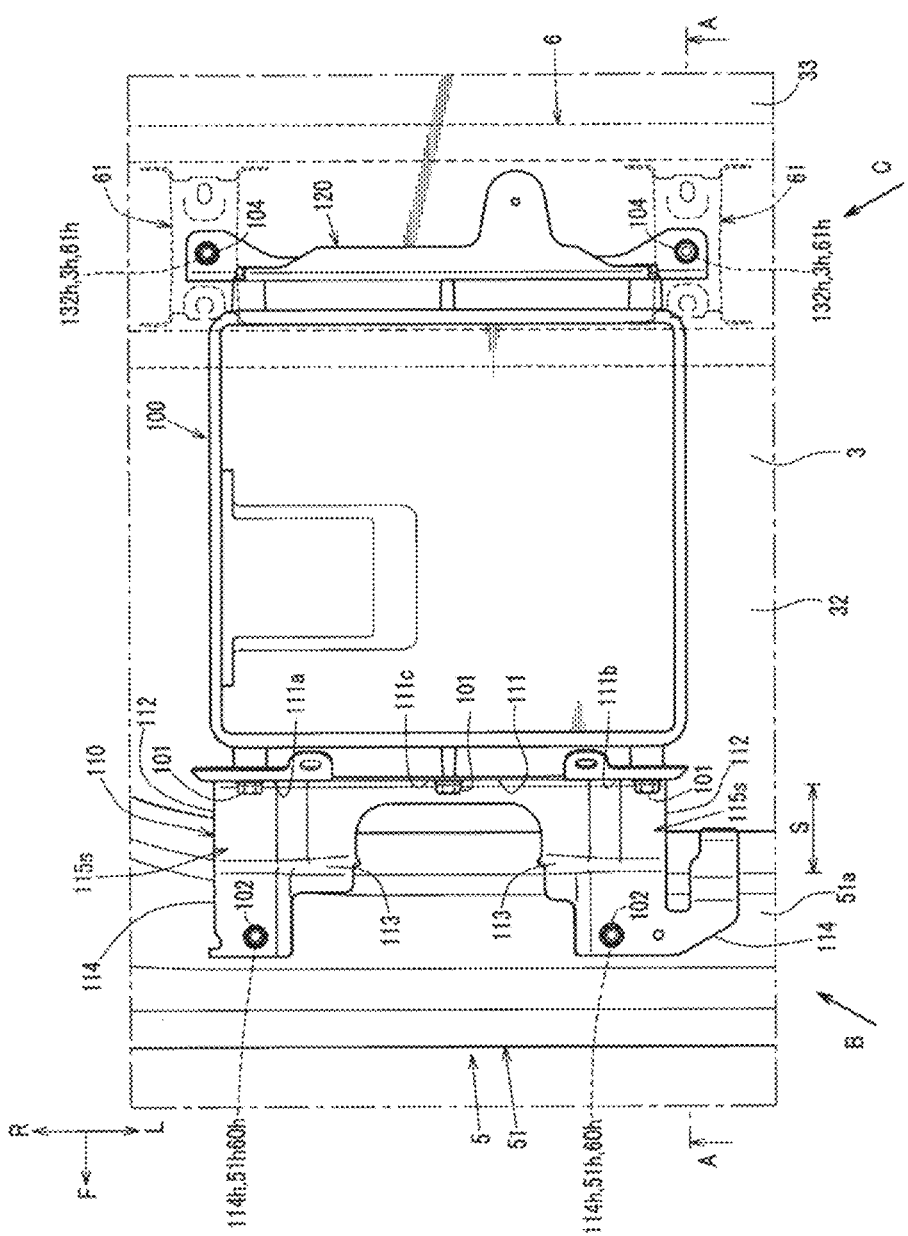
FIG. 2 is a plan view of a structure for attaching a high voltage component to a vehicle body of the present embodiment.

As shown in FIGS. 1 to 3, an accommodation portion 34 is formed rearward of the rear floor portion 33 as a recess extending to the vehicle lower side. The accommodation portion 34 is an accommodation space that can accommodate a vehicle component (an audio device 7 described later). In plan view, the accommodation portion 34 is formed as a recess that has a substantially oblong shape elongated in the vehicle width direction.

As shown in FIG. 3, the rear end panel 4 is joined to a rear end of the rear floor panel 3 and constitutes a back side of the vehicle body in the vehicle rear portion. The rear end panel 4 is composed of an outer end panel 41 to which the rear end of the rear floor panel 3 is joined and an inner end panel 42 located on a vehicle-width-direction inner side of the outer end panel 41 and joined to an upper portion of the outer end panel 41.

Figure 5:
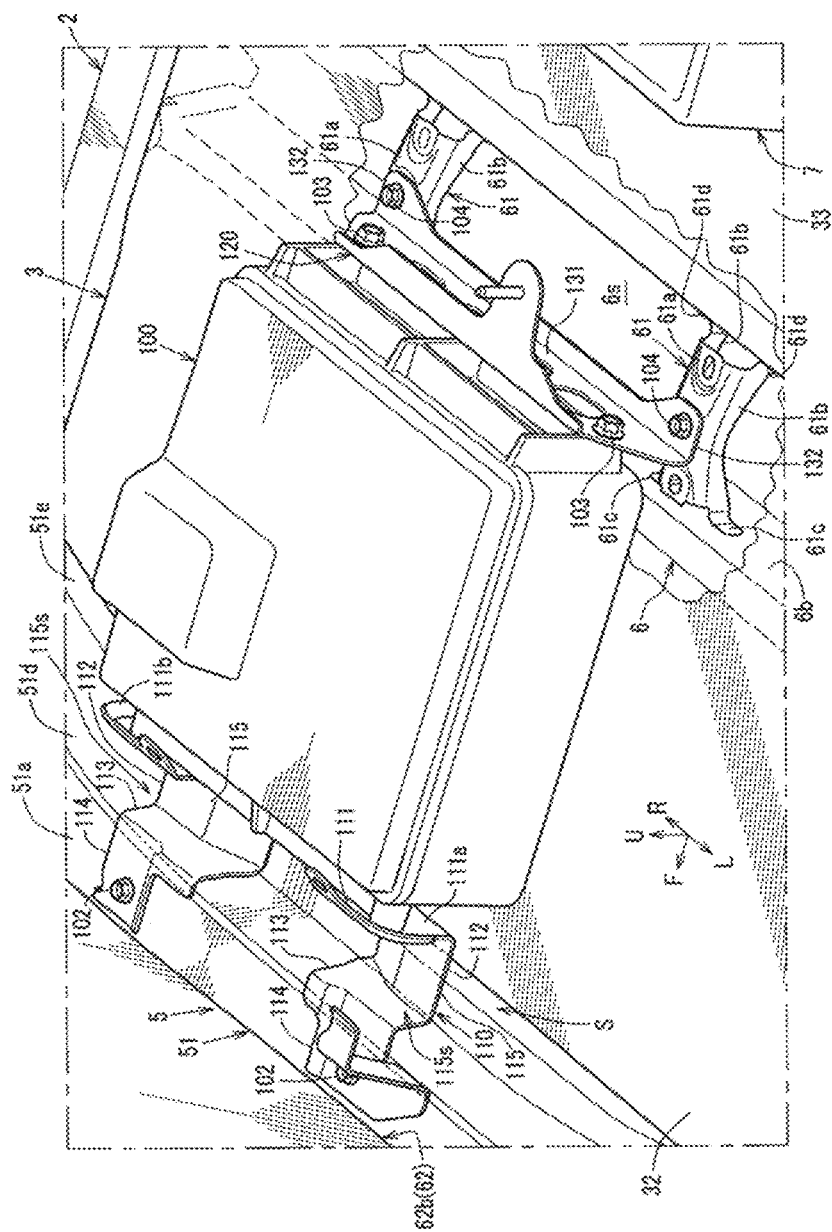
FIG. 5 is an enlarged perspective view of major parts of the rear structure of the vehicle of the present embodiment, as viewed in the direction of an arrow C in FIG. 2 and from above.
Figure 6:
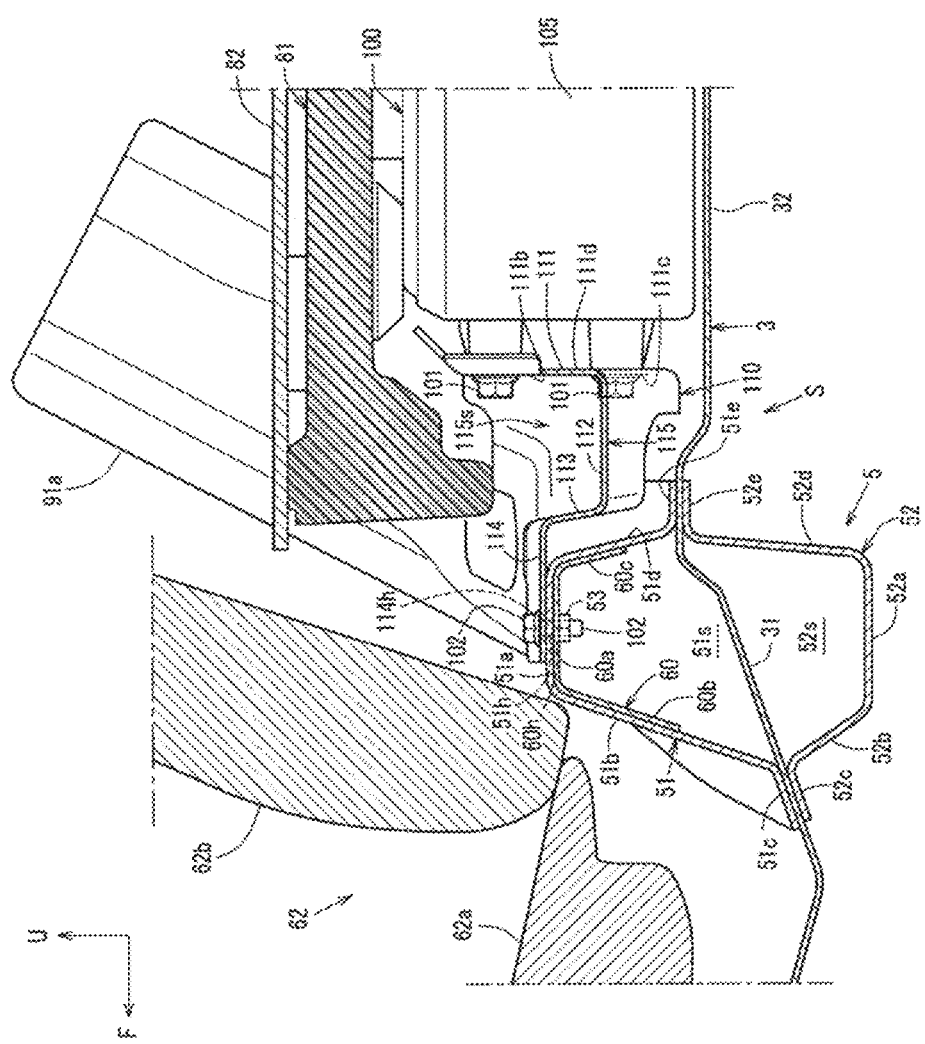
FIG. 6 is an enlarged sectional view of major parts of a structure for attaching the high voltage component to the vehicle body on the front side thereof, taken along the line A-A in FIG. 2.

As shown in FIGS. 3 and 6, the front-side rear cross member 5 is composed of an upper cross member 51 (see FIGS. 3 to 6) with a cross-section of a substantially hat-shaped profile protruding to the vehicle upper side in its vertical section along the vehicle front-rear direction, and a lower cross member 52 with a cross-section of a substantially hat-shaped profile protruding to the vehicle lower side in its vertical section along the vehicle front-rear direction. The upper cross member 51 and the lower cross member 52 are joined to each other across the inclined portion 31 of the rear floor panel 3.

As shown in FIGS. 3 and 6, the upper cross member 51 is joined to a top side of the inclined portion 31 and is formed to define, together with the inclined portion 31 of the rear floor panel 3, a substantially rectangular closed cross-sectional space 51s in vertical sectional view along the vehicle front-rear direction (see FIG. 6).

Figure 4:
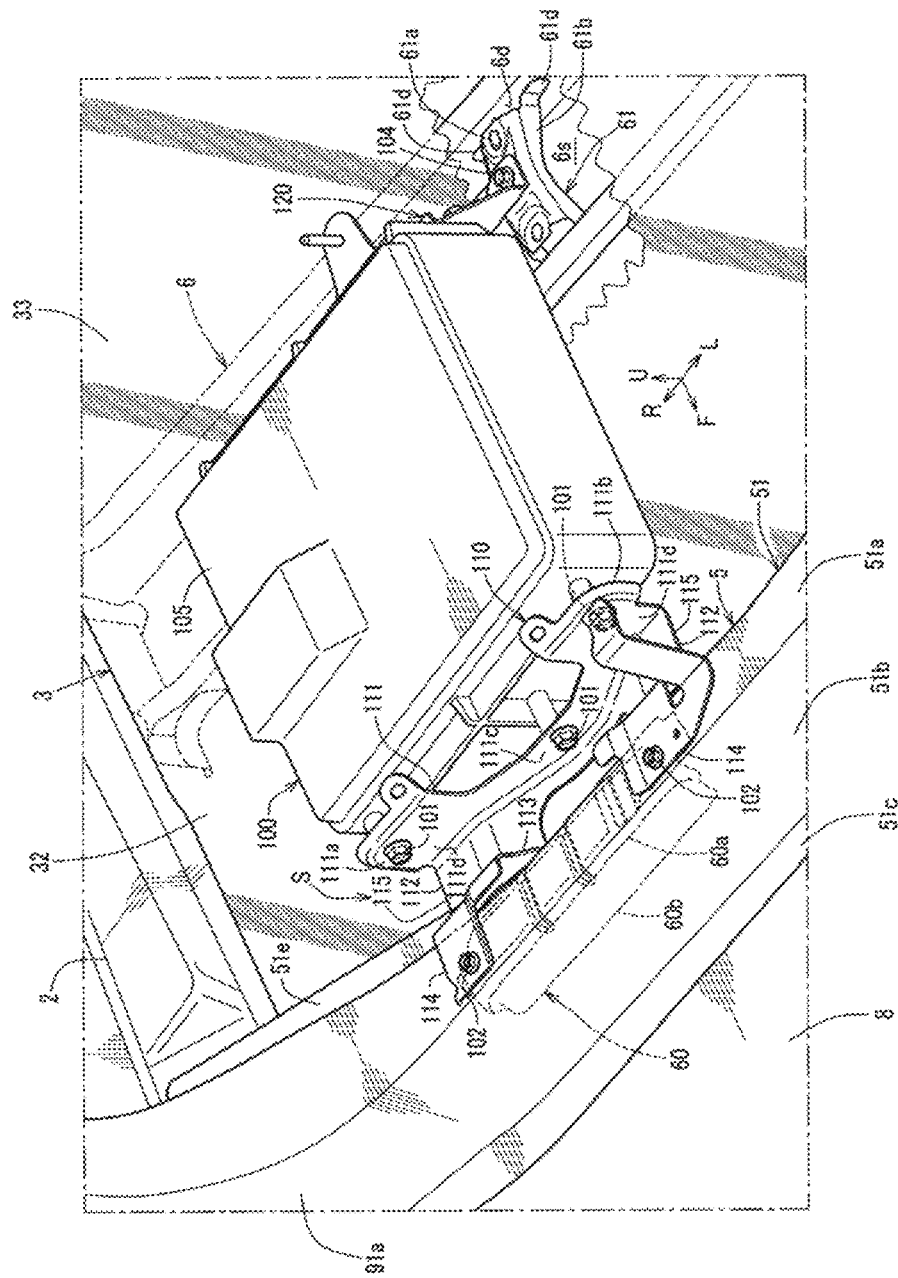
FIG. 4 is an enlarged perspective view of major parts of the rear structure of the vehicle of the present embodiment, as viewed in the direction of an arrow B in FIG. 2 and from above.

Specifically, as shown in FIGS. 4 to 6, in vertical sectional view along the vehicle front-rear direction, the upper cross member 51 is integrally formed of: an upper top face 51a facing the rear floor panel 3 at a position spaced apart from the rear floor panel 3 toward the vehicle upper side by a predetermined distance; an upper front face 51b extended from a front end of the upper top face 51a toward the vehicle lower side; an upper front-side flange 51c extended from a lower end of the upper front face 51b toward the vehicle front side; an upper rear face 51d extended from a rear end of the upper top face 51a toward the vehicle lower side; and an upper rear-side flange 51e extended from a lower end of the upper rear face 51d toward the vehicle rear side.

The upper front-side flange 51c and the upper rear-side flange 51e of the upper cross member 51 are joined to a top side of the rear floor panel 3. As shown in FIGS. 2, 4, and 6, the upper top face 51a of the upper cross member 51 is formed with multiple (two in this example; see FIGS. 2 and 4) insertion holes 51h allowing for insertion of respective fastening bolts 102 for fastening and fixing a front-side bracket 110 that supports a high voltage component 100 (described later).

As shown in FIGS. 4 and 6, the upper cross member 51 includes therein a front-side reinforcing member 60. The front-side reinforcing member 60 reinforces the upper cross member 51 itself and also reinforces the attachment of the front-side bracket 110 (described later) to the upper cross member 51. The front-side reinforcing member 60 has at least a length that allows the front-side reinforcing member 60 to connect between a pair of left and right vehicle body-side fixing portions 114 of the front-side bracket 110 (described later), and extends in the vehicle width direction along the upper cross member 51.

As shown in FIG. 6, the front-side reinforcing member 60 is provided inside a closed cross-sectional space formed between the upper cross member 51 and the inclined portion 31 and is joined in that space to an underside of the upper top face 51a of the upper cross member 51.

Specifically, as shown in FIGS. 4 and 6, in sectional view perpendicular to the vehicle width direction, the front-side reinforcing member 60 is integrally formed of: a top face 60a extending in the vehicle width direction so as to contact the upper top face 51a from the underside thereof; a front face 60b extending in a vehicle downward direction from a front end of the top face 60a so as to contact the upper front face 51b from a back side thereof; a rear face 60c (see FIG. 6) extending in the vehicle downward direction from a rear end of the top face 60a so as to contact the upper rear face 51d from a front side thereof. These faces 60a-60c form a gate-shaped cross-section.

As shown in FIG. 6, the top face 60a of the front-side reinforcing member 60 is formed, at its portions respectively corresponding to the multiple insertion holes 51h in the upper top face 51a in vehicle plan view, insertion holes 60h communicating with the corresponding insertion holes 51h in an up-down direction, and multiple weld nuts 53 for engagement with respective fastening bolts 102 are joined to the top face 60a from the underside thereof.

On the other hand, as shown in FIG. 6, the lower cross member 52 is joined to an underside of the inclined portion 31 of the rear floor panel 3 and defines, together with the inclined portion 31, a substantially rectangular closed cross-sectional space 52s in vertical sectional view along the vehicle front-rear direction.

Specifically, as shown in FIG. 6, in vertical sectional view along the vehicle front-rear direction, the lower cross member 52 is integrally formed of: a lower bottom face 52a facing the rear floor panel 3 at a position spaced apart from the rear floor panel 3 toward the vehicle lower side by a predetermined distance; a lower front face 52b extended from a front end of the lower bottom face 52a toward the vehicle upper side; a lower front-side flange 52c extended from an upper end of the lower front face 52b toward the vehicle front side; a lower rear face 52d extended from a rear end of the lower bottom face 52a toward the vehicle upper side; and a lower rear-side flange 52e extended from an upper end of the lower rear face 52d toward the vehicle rear side.

The lower front-side flange 52c and the lower rear-side flange 52e of the lower cross member 52 are respectively joined to the upper front-side flange 51c and the upper rear-side flange 51e of the upper cross member 51 across the inclined portion 31 of the rear floor panel 3.

Figure 7:
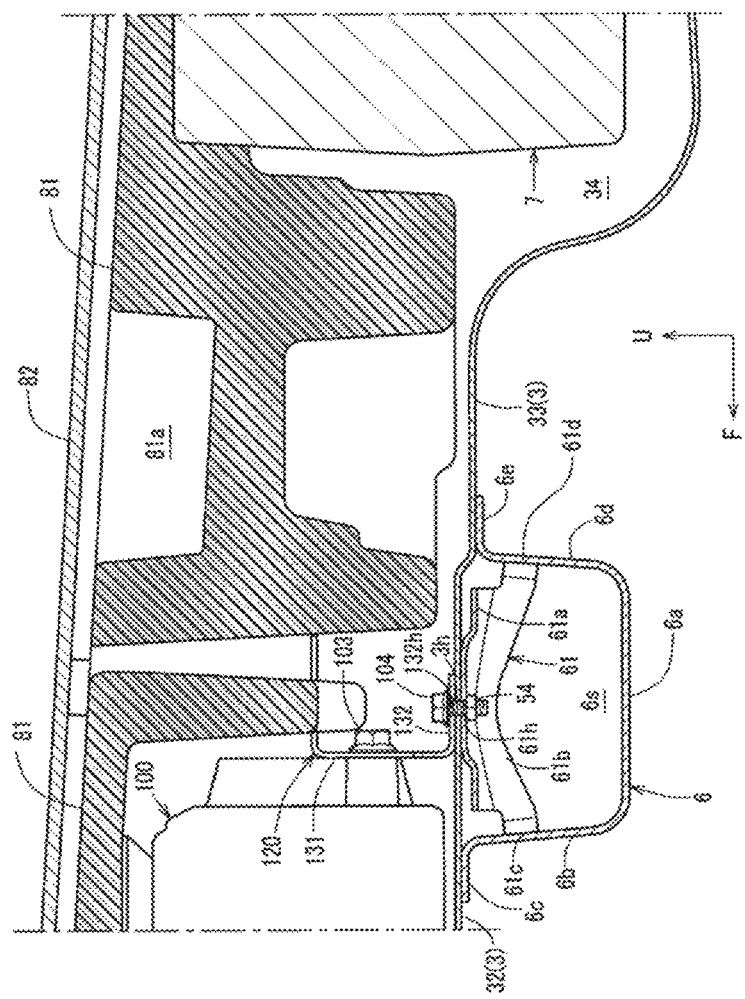
FIG. 7 is an enlarged sectional view of major parts of a structure for attaching the high voltage component to the vehicle body on the rear side thereof, taken along the line A-A in FIG. 2.

On the other hand, as shown in FIGS. 1 to 5 and 7, the rear-side rear cross member 6 is joined to a rear underside of the front floor portion 32 of the rear floor panel 3 at a position spaced apart from the front-side rear cross member 5 toward the vehicle rear side by a predetermined distance. As shown in FIG. 7, the rear-side rear cross member 6 is formed to define, together with the rear underside of the front floor portion 32, a substantially rectangular closed cross-sectional space 6s in vertical sectional view along the vehicle front-rear direction.

Specifically, as shown in FIG. 7, in vertical sectional view along the vehicle front-rear direction, the rear-side rear cross member 6 is integrally formed of: a bottom face 6a facing the rear floor panel 3 at a position spaced apart from the rear floor panel 3 toward the vehicle lower side by a predetermined distance; a front face 6b extended from a front end of the bottom face 6a toward the vehicle upper side; a front-side flange 6c extended from an upper end of the front face 6b toward the vehicle front side; a rear face 6d extended from a rear end of the bottom face 6a toward the vehicle upper side; and a rear-side flange 6e extended from an upper end of the rear face 6d toward the vehicle rear side. The front-side flange 6c and the rear-side flange 6e of the rear-side rear cross member 6 are joined to the underside of the rear floor panel 3.

Additionally, the rear floor panel 3 is formed, at its portions facing the rear-side rear cross member 6, with multiple (two in this example; see FIG. 2) insertion holes 3h spaced apart from each other in the vehicle width direction. The insertion holes 3h allow for insertion of respective fastening bolts 102 for fastening and fixing a rear-side bracket 120 (described later).

As shown in FIG. 2, in plan view of the rear floor panel 3, these insertion holes 3h are formed respectively on the slightly left outside and slightly right outside of the high voltage component 100 (described later), and are formed at an intermediate position of the rear-side rear cross member 6 in the vehicle front-rear direction.

As shown in FIGS. 1 to 5 and 7, the rear-side rear cross member 6 includes therein rear-side reinforcing members 61. The rear-side reinforcing members 61 reinforce the rear-side rear cross member 6 itself and also reinforce the attachment of the rear-side bracket 120 (described later) to the rear-side rear cross member 6. In the rear-side rear cross member 6 extending in the vehicle width direction, multiple (two in this example) rear-side reinforcing members 61 are provided at portions of the rear-side rear cross member 6 corresponding to left and right vehicle body-side fixing portions 132 (described later) of the rear-side bracket 120. In other words, these rear-side reinforcing members 61 are disposed at positions respectively on the slightly left outside and slightly right outside of the high voltage component 100 (described later) within a space inside the rear-side rear cross member 6 so as to connect between the front face 6b and the rear face 6d of the rear-side rear cross member 6. Thus, the rear-side reinforcing members 61 are formed in a joint-like manner so as to divide the space 6s inside the rear-side rear cross member 6 in the vehicle width direction.

Specifically, as shown in FIGS. 2, 4, 5, and 7, each rear-side reinforcing member 61 is integrally formed of: a top face 61a extending in the vehicle front-rear direction within the space 6s inside the rear-side rear cross member 6; a pair of left and right side faces 61b extending downward from respective edges in the vehicle width direction of the top face 61a; front-side flanges 61c extending frontward from respective front ends of the left and right side faces 61b and having their distal ends (front ends) bent in a direction away from each other in the vehicle width direction along the front face 6b; and rear-side flanges 61d extending rearward from respective rear ends of the left and right side faces 61b and having their distal ends (rear ends) bent in a direction away from each other in the vehicle width direction along the rear face 6d.

As shown in FIGS. 2, 5, and 7, the left and right front-side flanges 61c are joined to the front face 6b of the rear-side rear cross member 6, and, as shown in FIGS. 2, 4, and 7, the left and right rear-side flanges 61d are joined to the rear face 6d of the rear-side rear cross member 6.

As shown in FIG. 7, the top face 61a of the rear-side reinforcing member 61 is formed at its center with an insertion hole 61h allowing for insertion of the fastening bolt 102 for fastening and fixing the rear-side bracket 120 (described later), and a weld nut 54 for engagement with the fastening bolt 102 is joined to an underside of the top face 61a.

As shown in FIGS. 1 and 6, a rear seat 62 is disposed frontward of a space inside the trunk. The rear seat 62 includes a seat cushion 62a forming a seat portion for rear seat occupants and a seat back 62b forming a backrest portion for rear seat occupants. It should be noted that the rear seat 62 has been omitted from FIGS. 2 to 4, 6, 9, and 10.

As shown in FIG. 6, the rear seat 62 is disposed with its seat back 62b frontwardly adjacent to the upper cross member 51. The rear seat 62 of the present embodiment is disposed such that a lower end of the seat back 62b is located below the upper top face 51a of the upper cross member 51 and a rear lower end of the seat back 62b is located frontward of the front end of the upper top face 51a.

The rear seat 62 is installed on a floor panel located frontward of the rear floor panel 3. An occupant space above the floor panel and a trunk space above the rear floor panel 3 are in communication with each other in the vehicle front-rear direction.

As shown in FIGS. 6 and 7, multiple molded trays 81 are installed on the top side of the rear floor panel 3, and these molded trays 81 are disposed adjacent to peripheries of the high voltage component 100 (described later; see FIG. 1) and the audio device 7 (described later; see FIG. 1). Also as shown in FIGS. 6 and 7, a trunk board 82 made of synthetic resin is installed above the aforementioned rear floor panel 3 such that the trunk board 82 can be raised and lowered. When lowered, the trunk board 82 is disposed so as to cover from above the top face of the rear floor panel 3, namely the high voltage component 100, the audio device 7, and the multiple molded trays 81, and is formed as a flat trunk floor portion. It should be noted that the trunk board 82 and the molded trays 81 have been omitted from the figures other than FIGS. 6 and 7.

The above-described molded trays 81 are disposed so as to fill gaps around the high voltage component 100 and the audio device 7 between the rear floor panel 3 and the lowered trunk board 82. The molded trays 81 are formed with multiple storage recesses 81a (see FIG. 7) facing upward and having mutually different shapes for storage of vehicle maintenance tools and other luggage, and are formed as a whole of synthetic resin foam (so-called foam beads).

As shown in FIG. 6, the trunk board 82 is disposed at a position higher than the upper top face 51a of the front-side rear cross member 5, and its front end extends frontward up to a position frontward of downward curved portions 115 of the front-side bracket 110 and near the seat back 62b of the rear seat 62. In other words, at least the downward curved portions 115 of the front-side bracket 110 are covered by the trunk board 82.

Figure 8:
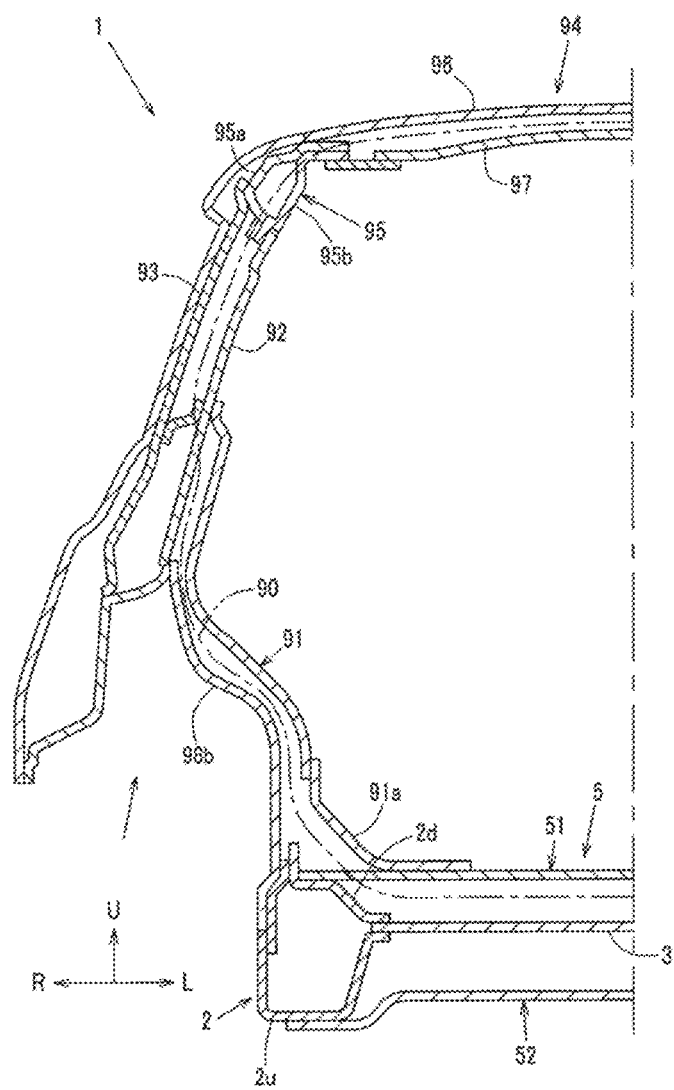
FIG. 8 is a half sectional view of a left side of the vehicle, illustrating a cross-section of an annular structure of the present embodiment taken along a direction in which multiple skeleton members disposed to surround a vehicle cabin extend.

By the way, as shown in FIG. 8, the rear structure of the vehicle of the present embodiment includes, at its portion substantially corresponding to the front-side rear cross member 5 in the vehicle front-rear direction, an annular structure 90 that is constituted by multiple skeleton members, including the front-side rear cross member 5, surrounding the vehicle cabin in vehicle front view. FIG. 8 is a sectional view of the rear structure of the vehicle at its portion substantially corresponding to the front-side rear cross member 5 in the vehicle front-rear direction, taken along a direction in which the multiple skeleton members disposed to surround the vehicle cabin in vehicle front view extend. FIG. 8 only shows a half-section on the left side of the vehicle as the section is symmetrical.

Specifically, as shown in FIG. 8, in a vehicle body side portion located on each side of the front-side rear cross member 5 (the upper cross member 51), a brace member 91 extends in the up-down direction from a lower end of a wheel well inner 98b forming a rear portion of the vehicle body side portion to an upper portion of a side inner panel 92. Lower ends of the left and right brace members 91 are respectively connected to left and right ends of the upper cross member 51 each via a gusset 91a.

The brace member 91 as one of the above skeleton members is joined to the side inner panel 92 and the wheel well inner 98b from the vehicle-width-direction inner side and forms a closed cross-section extending in the up-down direction between the brace member 91 and both of the side inner panel 92 and the wheel well inner 98b.

Also, in the vehicle body side portion located on each side of the front-side rear cross member 5, a side pillar 93 extends in the up-down direction from an upper end of the side inner panel 92 to a lower portion thereof. Roof side rails 95 are provided at respective left and right side edges of a roof portion 94 of the vehicle so as to extend along the side edges, and upper ends of the above left and right side pillars 93 are respectively joined to the left and right roof side rails 95 from a vehicle-width-direction outer side.

The side pillar 93 as one of the above skeleton members forms a closed cross-section extending in the up-down direction between the side pillar 93 and the side inner panel 92.

A lower portion of the side pillar 93 and an upper portion of the brace member 91 are disposed so as to face each other in the vehicle width direction across the side inner panel 92.

The roof side rail 95 as one of the above skeleton members includes a roof side rail outer 95a and a roof side rail inner 95b and forms a closed cross-section extending in the vehicle front-rear direction between the roof side rail outer 95a and the roof side rail inner 95b (inside the roof side rail 95).

The roof portion 94 further includes a roof panel 96 connecting the left and right roof side rails 95 in the vehicle width direction and a rear header 97 with a hat-shaped profile connecting the left and right roof side rails 95 in the vehicle width direction at a rear end of the roof portion 94 and having an upwardly opening cross-section in a direction perpendicular to the vehicle width direction. The rear header 97 as one of the skeleton members forms a closed cross-section extending in the vehicle width direction between the rear header 97 and the roof panel 96.

As described above, in the vehicle of the present embodiment, the annular structure 90 surrounding the vehicle cabin in vehicle front view is composed of: the side pillar 93 and the brace member 91 extending in the up-down direction on each side of the vehicle; the rear header 97 extending in the vehicle width direction above the vehicle cabin; the roof side rail 95 located at the corner between the side pillar 93 and the rear header 97; and the front-side rear cross member 5 extending in the vehicle width direction below the vehicle cabin. This prevents vehicle body rear members of the own vehicle, such as the rear floor panel 3 and the rear end panel 4, from moving frontward (toward the occupant space) when these members are crushed by a collision object intruding from the vehicle rear side in the event of a rear-end collision.

As shown in FIG. 1, the audio device 7 accommodated in the accommodation portion 34 as an in-vehicle component and the high voltage component 100 that is an electric component with relatively high voltage supported by the front-side rear cross member 5 are disposed on the top side of the rear floor panel 3 in the above configured vehicle 1.

The audio device 7 is for example a rear woofer unit and, as shown in FIG. 1, accommodated in the accommodation portion 34 so as to be positioned rightward in the vehicle width direction. As shown in FIG. 1, at least one end of the audio device 7 in the vehicle width direction is fastened and fixed to the rear side frame 2.

It should be noted that the audio device 7 has been omitted from FIGS. 3, 4, 8, and 9.

The high voltage component 100 is for example a charger electrically connected to the vehicle battery (not shown) and, as shown in FIG. 1, is disposed between the front-side rear cross member 5 and the rear-side rear cross member 6, namely on the front floor portion 32, so as to be positioned rightward in the vehicle width direction relative to an approximate center in the vehicle width direction.

Specifically, as shown in FIGS. 1 to 5, the high voltage component 100 is disposed on the front floor portion 32 at a position spaced rearward from the upper cross member 51 and closer to the rear-side rear cross member 6 than to the upper cross member 51. This results in the high voltage component 100 being disposed such that the rear-side rear cross member 6 is located directly below a rear portion of the high voltage component 100, as shown in FIGS. 3, 4, and 7. That is, the rear portion of the high voltage component 100 is disposed so as to overlap the rear-side rear cross member 6 in vehicle plan view.

As shown in FIG. 6, when mounted on the vehicle 1, the high voltage component 100 is formed of a substantially box-like shape having a top side positioned on the vehicle upper side of the upper top face 51a of the front-side rear cross member 5 and having an underside adjacent to the top side of the rear floor panel 3.

As shown in FIGS. 1 and 2, the above high voltage component 100 is supported by the vehicle body at its front end via the front-side bracket 110 fastened and fixed to the front-side rear cross member 5 and at its rear end via the rear-side bracket 120 fastened and fixed to the rear floor panel 3.

As shown in FIGS. 2 and 4 to 6, the front-side bracket 110 is a member formed by bending a flat metal plate with a predetermined thickness and is integrally formed of: a component-side fixing portion 111 fastened and fixed to the front side of the high voltage component 100; a frontward extended portion 112 extended from the component-side fixing portion 111; two upward extended portions 113 extended from the frontward extended portion 112; and two vehicle body-side fixing portions 114 extended from the respective upward extended portions 113.

As shown in FIG. 6, the component-side fixing portion 111 is formed in a substantially flat shape having a thickness in the vehicle front-rear direction and positioned on the vehicle upper side of the upper top face 51a of the front-side rear cross member 5 with a lower end of the component-side fixing portion 111 positioned slightly on the vehicle upper side of the underside of the high voltage component 100.

Specifically, as shown in FIGS. 2, 4, and 6, the component-side fixing portion 111 is integrally formed of: a right-side fixing portion 111a (see FIGS. 2 and 4) fastened and fixed to a right upper portion in the vehicle width direction of the front side of the high voltage component 100 via the fastening bolt 101; a left-side fixing portion 111b fastened and fixed to a left upper portion in the vehicle width direction of the front side of the high voltage component 100 via the fastening bolt 101; and a central fixing portion 111c fastened and fixed to a substantially lower central portion in the vehicle width direction of the front side of the high voltage component 100 via the fastening bolt 101.

As shown in FIG. 4, lower ends of the right-side fixing portion 111a and the left-side fixing portion 111b of the component-side fixing portion 111 are formed so as to extend substantially linearly in the vehicle width direction, and a lower end of the central fixing portion 111c of the component-side fixing portion 111 is formed in a substantially arc shape protruding to the vehicle lower side in vehicle plan view.

As shown in FIGS. 5 and 6, the frontward extended portion 112 is shaped to be extended to the vehicle front side integrally from lower ends of the left-side fixing portion 111b, the right-side fixing portion 111a, and the central fixing portion 111c of the component-side fixing portion 111.

As shown in FIGS. 2 and 5, the upward extended portions 113 are shaped to be extended to the vehicle front upper side respectively from a front end of a portion of the frontward extended portion 112 extended from the right-side fixing portion 111a of the component-side fixing portion 111 and from a front end of a portion of the frontward extended portion 112 extended from the left-side fixing portion 111b of the component-side fixing portion 111.

As shown in FIGS. 4 to 6, the vehicle body-side fixing portions 114 are extended to the vehicle front side from upper ends of the respective upward extended portions 113 and located at substantially the same position as the upper top face 51a of the front-side rear cross member 5 in the vehicle up-down direction. As shown in FIGS. 2 and 6, each vehicle body-side fixing portion 114 is formed with an insertion hole 114h allowing for insertion of the fastening bolt 102.

As shown in FIG. 6, the vehicle body-side fixing portion 114, the upper top face 51a of the front-side rear cross member 5, and the top face 60a of the front-side reinforcing member 60 are fastened and fixed in such a manner that the upper top face 51a is interposed between the vehicle body-side fixing portion 114 and the top face 60a, by means of the weld nut 53 and the fastening bolt 102 through the corresponding insertion holes 114h, 51h, and 60h respectively formed in the vehicle body-side fixing portion 114, the upper top face 51a, and the top face 60a.

Co-fastening the front-side reinforcing member 60 to the front-side rear cross member 5 in addition to the front-side bracket 110 in the above manner reinforces the portion at which the front-side bracket 110 is attached to the front-side rear cross member 5.

In other words, as shown in FIGS. 4 to 6, the front-side bracket 110 includes, on its left and right sides, downward curved portions 115 that extend frontward from the front face of the high voltage component 100 and deform under a load in the vehicle front-rear direction.

Specifically, as shown in FIGS. 4 and 6, almost entirety of the right-side fixing portion 111a and the left-side fixing portion 111b extending in the up-down direction in the component-side fixing portion 111 of the front-side bracket 110 are located above the vehicle body-side fixing portions 114 extending in the vehicle front-rear direction.

Lower portions 111d respectively below the right-side fixing portion 111a and the left-side fixing portion 111b, which are located respectively in the upper right and left sides of the component-side fixing portion 111, face the upward extended portions 113 from positions rearward thereof. In each of the left and right sides of the front-side bracket 110, the downward curved portion 115 is constituted by the corresponding lower portion 111d, the corresponding upward extended portion 113, and the frontward extended portion 112 connecting these portions 111d, 113 in the vehicle front-rear direction. Each downward curved portion 115 is formed to protrude downward, and, as shown in FIGS. 5 and 6, an upward opening space 115s opening upward is defined by the lower portion 111d of the component-side fixing portion 111, the upward extended portion 113, and the frontward extended portion 112.

Each downward curved portion 115 is formed to be compressively deformable in the vehicle width direction such that the upward opening space 115s collapses, under a load in the vehicle width direction.

Specifically, the high voltage component 100 includes a metal case 105 covering the whole high voltage component 100. The front-side bracket 110 is a member formed by bending a metal flat plate, as described above. The component-side fixing portion 111 of the front-side bracket 110 entirely made of metal (e.g., aluminum and aluminum alloy) is fastened and fixed to a front face of the case 105 of the high voltage component 100 with the fastening bolts 101 made of steel.

Meanwhile, as described above, the vehicle body-side fixing portions 114 of the front-side bracket 110 are fastened and fixed to the upper top face 51a of the front-side rear cross member 5 made of steel with the fastening bolts 101 made of steel.

As such, the front-side bracket 110 is structured to also serve as a ground connection member that electrically connects the front-side bracket 110 and the front-side rear cross member 5 (vehicle body) for ground connection of the high voltage component 100 to the vehicle body.

As shown in FIGS. 5 and 7, the rear-side bracket 120 is a member formed by bending a metal flat plate with a predetermined thickness and is integrally formed of: a component-side fixing portion 131 fastened and fixed to a back side of the high voltage component 100; and vehicle body-side fixing portions 132 extended from left and right sides of the component-side fixing portion 131.

The component-side fixing portion 131 is formed in a substantially flat plate shape having a thickness in the vehicle front-rear direction and having a lower height than the back side of the high voltage component 100. The component-side fixing portion 131 extends linearly in the up-down direction (vertical direction) until its lower end almost reaches the top side of the rear floor panel 3. As shown in FIGS. 5 and 7, the component-side fixing portion 131 is joined and fixed to lower portions in the vehicle-width-direction outer side of the back side of the high voltage component 100 each with a fastening bolt 103.

The vehicle body-side fixing portions 132 are formed in a substantially flat shape extended from left and right sides of a lower end of the component-side fixing portion 131 toward the vehicle rear side along the top side of the rear floor panel 3. As shown in FIG. 7, each vehicle body-side fixing portion 132 is formed, at its center in plan view, with an insertion hole 132h allowing for insertion of a fastening bolt 104 for fastening and fixing the rear-side bracket 120 to the rear floor panel 3.

As shown in FIG. 2, each vehicle body-side fixing portion 132 overlaps the top face 61a of the rear-side reinforcing member 61 in vehicle plan view, and the insertion hole 132h formed in each vehicle body-side fixing portion 132 coincides with the corresponding insertion hole 61h formed in the top face 61a of the rear-side reinforcing member 61 in vehicle plan view.

The vehicle body-side fixing portion 132, the rear floor panel 3, and the top face 61a of the rear-side reinforcing member 61 are fastened and fixed in such a manner that the rear floor panel 3 is interposed between the vehicle body-side fixing portion 132 and the top face 61a, by means of the weld nut 54 and the fastening bolt 102 through the corresponding insertion holes 132h, 3h, and 61h respectively formed in the vehicle body-side fixing portion 132, the rear floor panel 3, and the top face 61a.

Co-fastening the rear-side bracket 120 and the rear-side reinforcing member 61 to the rear floor panel 3 reinforces the portion at which the rear-side bracket 120 is attached to the rear floor panel 3.

In the above configuration, a rear end of the high voltage component 100 is attached via the rear-side bracket 120 to the rear-side reinforcing member 61 provided in the rear-side rear cross member 6.

In this state, as shown in FIGS. 5 and 7, the rear end of the high voltage component 100 is disposed directly above the rear-side rear cross member 6 via the rear floor panel 3 and is disposed at a position frontward of the rear end of the rear-side rear cross member 6 (rear end of the rear-side flange 6e) including the rear end of the rear-side bracket 120 (rear ends of the vehicle body-side fixing portions 132).

Figure 9:
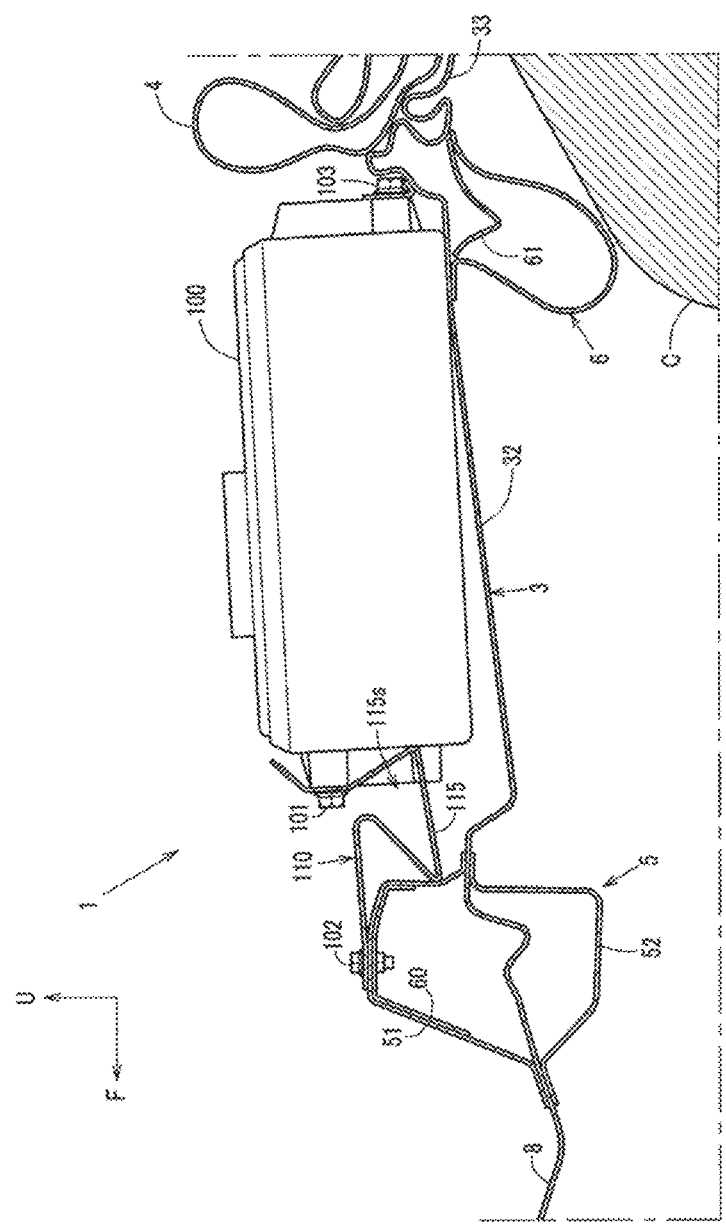
FIG. 9 is an enlarged sectional view of major parts during a medium phase of a rear-end collision, taken along the line A-A in FIG. 2.
Figure 10:
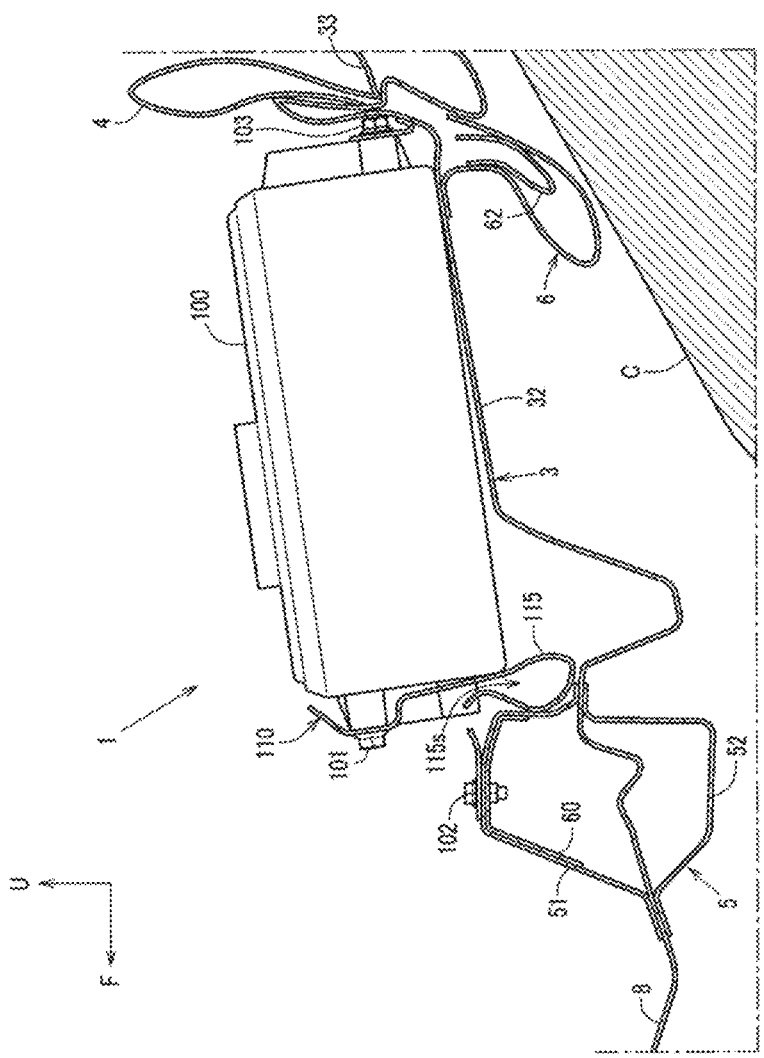
FIG. 10 is an enlarged sectional view of major parts during a later phase of a rear-end collision, taken along the line A-A in FIG. 2.

With reference to FIGS. 9 and 10, a description will be given of functions and effects of the above rear structure of the vehicle when a collision object C collides with the vehicle from behind.

When the collision object C collides with the vehicle 1 from behind, the rear end panel 4 is pressed toward the vehicle front side, which causes the rear floor portion 33 located rearward of the rear-side rear cross member 6 of the rear floor panel 3 to be crushed in the vehicle front-rear direction while experiencing folding deformation including its accommodation portion 34 (see FIG. 1).

The high voltage component 100 is disposed between the upper cross member 51 and the rear-side rear cross member 6 on the rear floor panel 3, namely on the front floor portion 32. Thus, the rear-side rear cross member 6 blocks the collision object C itself from intruding further frontward when it intrudes from the vehicle rear side toward the vehicle front side, and this allows to avoid direct collision of the collision object C with the high voltage component 100 itself.

However, the vehicle body rear members located rearward of the rear-side rear cross member 6, such as the rear floor panel 3 and the rear end panel 4, of the own vehicle are displaced toward the vehicle front side while being crushed in the vehicle front-rear direction as the collision object C intrudes from the vehicle rear side, as described above. Accordingly, the high voltage component 100 is pressed frontward due to the vehicle body rear members crushed by the rear-end collision colliding with the high voltage component 100 from behind, as shown in FIG. 9.

As a result of the high voltage component 100 being pressed frontward by the vehicle body rear members crushed by the rear-end collision, the rear-side bracket 120 at the rear portion of the high voltage component 100 may come off from the rear floor panel 3 due to a shear force acting on the fastening bolts 104 (see FIGS. 5 and 7) fastening the rear-side bracket 120 to the rear floor panel 3.

On the other hand, in the present embodiment, as described above, the front portion of the high voltage component 100 is disposed away from the upper cross member 51 toward the rear-side rear cross member 6 so that a gap S is created between the upper rear face 51d of the upper cross member 51 and the front face of the high voltage component 100 in the vehicle front-rear direction (see FIGS. 2 to 6, particularly to FIG. 6). Further, the high voltage component 100 is attached to the upper cross member 51 via the front-side bracket 110 that is compressively deformable under a load in the vehicle front-rear direction, and the front-side bracket 110 is disposed in the gap S (see the same figures).

Accordingly, even when the rear-side bracket 120 comes off from the rear floor panel 3 due to an extrusion load toward the vehicle front side being applied to the high voltage component 100 in the event of a rear-end collision, the high voltage component 100 is displaced frontward in the gap S so as to escape from the load while being compressively deformed in the vehicle front-rear direction, as shown in FIG. 9.

This prevents a collision load from being directly applied from the vehicle body rear members crushed by the rear-end collision to the high voltage component 100.

Specifically, as shown in FIGS. 9 and 10, the front-side bracket 110 is compressively deformed under a load in the vehicle front-rear direction such that the downward curved portion 115 protrudes downward, or in other words, such that the upward opening space 115s (see FIGS. 5 and 6) formed by the downward curved portion 115 collapses in the vehicle front-rear direction.

This compressive deformation of the front-side bracket 110 allows the high voltage component 100 to be displaced to escape frontward and also allows it to be kept attached to the upper cross member 51 via the front-side bracket 110.

Specifically, the deformation of the front-side bracket 110 mitigates a sear force that is applied via the front-side bracket 110 to the fastening bolts 102 at the fastening portion for fastening the front-side bracket 110 to the upper cross member 51 due to a frontward extrusion load being applied to the high voltage component 100.

Thus, the rear structure of the vehicle 1 can prevent damage to the high voltage component 100 that may otherwise occur from the collision load applied to the vehicle rear portion from the vehicle rear side. Further, when the front-side bracket 110 is compressively deformed under the load in the vehicle front-rear direction, the front-side bracket 110 can absorb the frontward extrusion load applied to the high voltage component 100. This allows to avoid a situation where the high voltage component 100 jumps frontward and violently collides with the seat back 62b (see FIG. 6) of the rear seat 62.

Additionally, in the present embodiment, the upper cross member 51 is disposed on the rear floor panel 3 from the top side of the rear floor panel 3, and the ends of the upper cross member 51 in the vehicle width direction are connected to respective lower ends of the left and right brace members 91 (only the brace member 91 on the vehicle left side is shown in the figure) extending up and down on respective sides of the vehicle body (see FIGS. 1 and 8).

Accordingly, even if the deformation of the front-side bracket 110 fails to fully absorb the frontward extrusion load applied from the deforming vehicle body rear members of the own vehicle to the high voltage component 100 in the event of a rear-end collision, the upper cross member 51 firmly receives the high voltage component 100 and prevents it from being displaced frontward.

In particular, in the present embodiment, the annular structure 90 surrounding the vehicle cabin in vehicle front view is constituted by the multiple skeleton members including the front-side rear cross member 5 and the brace members 91 at the portion substantially corresponding to the front-side rear cross member 5 in the vehicle front-rear direction (see FIG. 8). This allows to receive the high voltage component 100 more firmly when it is about to be displaced frontward in the event of a rear-end collision.

In one aspect of this disclosure, the rear end of the high voltage component 100 is disposed directly above the rear-side rear cross member 6 and attached to the reinforcing member provided in the space 6s inside the rear-side rear cross member 6 (see FIGS. 5 and 7).

With the above configuration, disposing the rear end of the high voltage component 100 directly above the rear-side rear cross member 6 allows the high voltage component 100 to be attached as close to the rear-side rear cross member 6 as possible. This in turn allows to ensure, to the extent possible, the gap S (space in the vehicle front-rear direction; see FIGS. 3 to 5) between the high voltage component 100 and the upper cross member 51 located frontward thereof.

This increases protection of the high voltage component 100 as the high voltage component 100 is moved frontward so as to escape from the frontward extrusion force that is applied from the collision object C to the high voltage component 100 in the event of a rear-end collision.

Further, the rear end of the high voltage component 100 is fastened and fixed to the rear-side reinforcing member 61 as a reinforcing member provided in the rear-side rear cross member 6, and this strengthens the attachment of the high voltage component 100 to the vehicle body on the rear side thereof.

In the present embodiment, as described above, the rear end of the high voltage component 100 is disposed directly above the rear-side rear cross member 6 and is disposed frontward of the rear end of the rear-side rear cross member 6 including the rear end of the rear-side bracket 120.

This allows to also ensure, to the extent possible, the trunk space (longitudinal length of the rear floor portion 33) located rearward of the rear end of the high voltage component 100 (or more strictly the rear-side bracket 120).

In one aspect of this disclosure, the front-side bracket 110 also serves as a ground for the high voltage component 100.

With the above configuration, the high voltage component 100 can be ground-connected at the front side thereof in the front portion of the rear floor panel 3 via the front-side bracket 110. This allows to surely maintain the ground connection even after a rear-end collision, as compared to a configuration in which the rear side of the high voltage component 100, which will experience large deformation by the rear-end collision, is ground-connected to the vehicle body.

As the front-side bracket 110 itself serves as a ground connection member besides as a member for attaching the high voltage component 100 on the vehicle body, ground wire for connecting the high voltage component 100 and the vehicle body can be eliminated. This allows to surely maintain the ground connection between the high voltage component 100 and the vehicle body even after a rear-end collision, as compared to the use of the ground wire.

In one aspect of this disclosure, the high voltage component 100 is disposed below the trunk board 82 covering from above the rear floor panel 3 (see FIGS. 6 and 7), and the front-side bracket 110 includes the downward curved portions 115 that extend frontward from the front face of the high voltage component 100 and are deformable under a load in the vehicle front-rear direction (see FIG. 5).

With the above configuration, the front-side bracket 110 includes the downward curved portions 115, and these downward curved portions 115 can be deformed to protrude downward when the front-side bracket 110 is compressively deformed in the vehicle front-rear direction in the event of a rear-end collision (see FIGS. 9 and 10).

This allows to avoid a situation where the deformed downward curved portions 115 contact the trunk board 82 located above when the front-side bracket 110 is compressively deformed in the vehicle front-rear direction, and this in turn allows the front-side bracket 110 itself to be surely deformed in the vehicle front-rear direction.

In one aspect of this disclosure, the rear seat 62 (seat) is disposed frontwardly adjacent to the upper cross member 51 (see FIGS. 1, 5, and 6), and the front-side bracket 110 is attached to the upper top face 51a (upper face) of the upper cross member 51 (see FIGS. 2 to 6).

The above configuration can prevent the front-side bracket 110 from interfering with the rear seat 62. Also, as workers can easily access the upper top face 51a of the upper cross member 51 from the trunk side when attaching the front-side bracket 110 to the upper cross member 51, the above configuration allows for easy attachment of the front-side bracket 110 to the upper cross member 51.

In this configuration, even when the high voltage component 100 moving frontward collides with the seat back 62b of the rear seat 62 in the event of a rear-end collision, the front-side bracket 110 can reduce that impact by absorbing the frontward pressing force applied from the collision object C to the high voltage component 100.

In one aspect of this disclosure, the front-side bracket 110 is attached to the front-side reinforcing member 60 (reinforcing member) provided in the upper cross member 51 (see FIGS. 4 and 6).

The above configuration allows to more firmly maintain the attachment of the front-side bracket 110 to the upper cross member 51 in the event of a rear-end collision and thus to further restrain the frontward displacement of the high voltage component 100 in the event of the rear-end collision.

This disclosure is not limited to the configuration in the above embodiment and may be implemented in various embodiments.

What is claimed is:

1. A rear structure of a vehicle, comprising:
   a front-side cross member and a rear-side cross member respectively disposed on front and rear sides in a front portion of a rear floor, the front-side cross member and the rear-side cross member extending in a vehicle width direction and being spaced apart from each other in a vehicle front-rear direction; and
   a high voltage component disposed between the front-side cross member and the rear-side cross member on a top side of the rear floor, wherein
   the front-side cross member is disposed on the rear floor from the top side of the rear floor, and ends of the front-side cross member in the vehicle width direction are connected to respective lower ends of left and right brace members extending up and down on respective sides of a vehicle body,
   the rear-side cross member is disposed on the rear floor from an underside of the rear floor,
   the high voltage component is disposed rearwardly spaced apart from the front-side cross member and closer to the rear-side cross member than to the front-side cross member, and
   the high voltage component is attached to the front-side cross member and the rear-side cross member, and the high voltage component is attached to the front-side cross member via a bracket that deforms under a load in the vehicle front-rear direction.

2. The rear structure of a vehicle according to claim 1, wherein
   a rear end of the high voltage component is disposed directly above the rear-side cross member and is attached to a reinforcing member provided in the rear-side cross member.

3. The rear structure of a vehicle according to claim 2, wherein the bracket is structured to also serve as a ground for the high voltage component.

4. The rear structure of a vehicle according to claim 3, wherein
the high voltage component is disposed below a trunk board that covers from above the rear floor, and
the bracket includes a downward curved portion that extends frontward from a front face of the high voltage component and is deformable under a load in the vehicle front-rear direction.

5. The rear structure of a vehicle according to claim 4, wherein
a seat is disposed frontwardly adjacent to the front-side cross member, and the bracket is attached to a top face of the front-side cross member.

6. The rear structure of a vehicle according to claim 5, wherein
the bracket is attached to a reinforcing member provided in the front-side cross member.

7. The rear structure of a vehicle according to claim 1, wherein
the bracket is structured to also serve as a ground for the high voltage component.

8. The rear structure of a vehicle according to claim 1, wherein
the high voltage component is disposed below a trunk board that covers from above the rear floor, and
the bracket includes a downward curved portion that extends frontward from a front face of the high voltage component and is deformable under a load in the vehicle front-rear direction.

9. The rear structure of a vehicle according to claim 2, wherein
the high voltage component is disposed below a trunk board that covers from above the rear floor, and
the bracket includes a downward curved portion that extends frontward from a front face of the high voltage component and is deformable under a load in the vehicle front-rear direction.

10. The rear structure of a vehicle according to claim 7, wherein
the high voltage component is disposed below a trunk board that covers from above the rear floor, and
the bracket includes a downward curved portion that extends frontward from a front face of the high voltage component and is deformable under a load in the vehicle front-rear direction.

11. The rear structure of a vehicle according to claim 10, wherein
a seat is disposed frontwardly adjacent to the front-side cross member, and the bracket is attached to a top face of the front-side cross member.

12. The rear structure of a vehicle according to claim 11, wherein
the bracket is attached to a reinforcing member provided in the front-side cross member.

13. The rear structure of a vehicle according to claim 2, further comprising:
an upper cross member that includes a front-side reinforcing member, the front-side reinforcing member reinforces the upper cross member and reinforces attachment of the bracket to the upper cross member, the front-side reinforcing member has at least a length that allows the front-side reinforcing member to connect between a pair of left and right vehicle body-side fixing portions of the front-side bracket, and extends in the vehicle width direction along the upper cross member.

14. The rear structure of a vehicle according to claim 2, further comprising:
a front-side reinforcing member provided inside a closed cross-sectional space between an upper cross member and an inclined portion of the rear floor, and is joined in that space to an underside of an upper top face of the upper cross member.

15. The rear structure of a vehicle according to claim 2, further comprising:
a front-side reinforcing member integrally formed of a top face extending in the vehicle width direction so as to contact an upper top face of an upper cross member from the underside thereof;
a front face extending in a vehicle downward direction from a front end of the top face so as to contact an upper front face of the upper cross member from a back side thereof; and
a rear face extending in the vehicle downward direction from a rear end of the top face so as to contact the upper rear face from a front side thereof;
wherein the top face, the front face and the rear face form a gate-shaped cross-section.

16. The rear structure of a vehicle according to claim 13, further comprising:
a front-side reinforcing member provided inside a closed cross-sectional space between the upper cross member and an inclined portion of the rear floor, and is joined in that space to an underside of an upper top face of the upper cross member.

17. The rear structure of a vehicle according to claim 16, further comprising:
a front-side reinforcing member integrally formed of
a top face extending in the vehicle width direction so as to contact an upper top face of the upper cross member from the underside thereof;
a front face extending in a vehicle downward direction from a front end of the top face so as to contact an upper front face of the upper cross member from a back side thereof; and
a rear face extending in the vehicle downward direction from a rear end of the top face so as to contact the upper rear face from a front side thereof;
wherein the top face, the front face and the rear face form a gate-shaped cross-section.

* * * * *